M. B. IRELAND.
IGNITION MEANS FOR COMBUSTION ENGINES.
APPLICATION FILED JAN. 12, 1912.
1,258,117.
Patented Mar. 5, 1918.
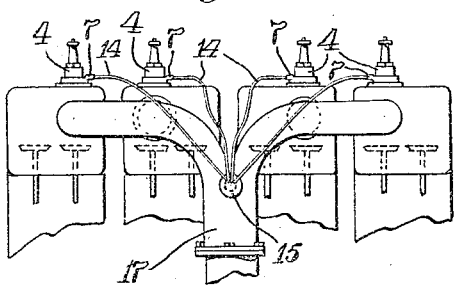
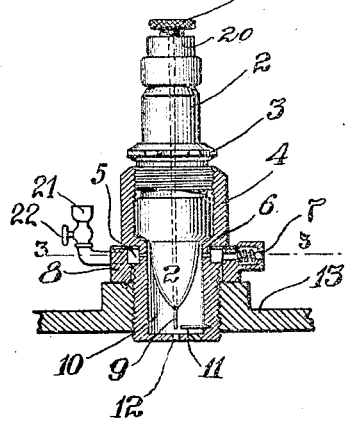
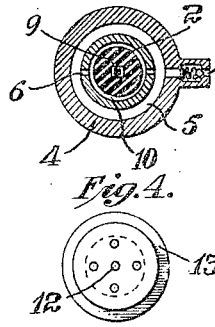
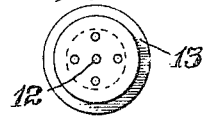
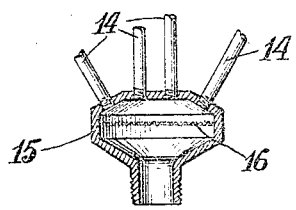
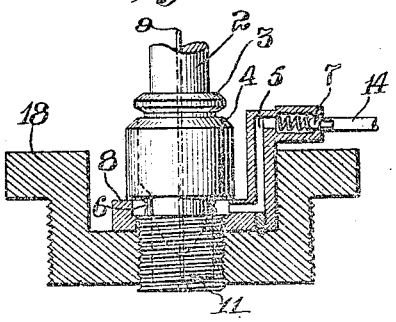
Attest:
JCMitchum
Peter A Roe
Inventor:
Morris B Ireland
by Edwards, Sager, Wooster
Attys.

UNITED STATES PATENT OFFICE.

MORRIS B. IRELAND, OF NEW YORK, N. Y.

IGNITION MEANS FOR COMBUSTION-ENGINES.

1,258,117.  Specification of Letters Patent.  Patented Mar. 5, 1918.

Application filed January 12, 1912. Serial No. 670,827.

*To all whom it may concern:*

Be it known that I, MORRIS B. IRELAND, a citizen of the United States residing at New York city, in the county of New York and State of New York, have invented certain new and useful Improvements in Ignition Means for Combustion-Engines, of which the following is a full, clear, and exact specification.

This invention relates to ignition means for combustion engines, and has particular reference to means for improving the ignition of the combustible gas in a combustion engine, and also for preventing the deposition of carbon or other foreign materials on the electrodes.

The principal source of trouble with spark plugs at present used is that they become fouled with unconsumed carbon, which is derived principally from the oil used in lubricating the engine. Moreover, spark plugs, even when not fouled by carbon, frequently fail to ignite the charge by reason of impurity thereof, both of which difficulties this invention overcomes.

According to this invention, I propose to construct the ignition means in such manner that during each cycle of the engine, a blast of gas, or combustible mixture, will be directed past the electrode into the cylinder, and thereby violently dislodging any particles of carbon which might otherwise lodge on the electrode and eventually produce a short circuit, or a spark insufficient to ignite the charge. Preferably, I propose to obtain this blast of gas from the carbureter, or other source of combustible gas, such as an acetylene tank, whereby the carbon is not only blown away from the electrodes, but there is always obtained a pure body of gas adjacent the electrodes at the moment of the ignition. It is well known that the ordinary charge in a combustion engine is not homogeneous, as there is usually some residue of burned gases left from a previous explosion, which mixes with the new charge and reduces its combustibility. By this invention, a small body of pure gas is always immediately adjacent the electrodes, which upon being fired by the spark within its special chamber communicates its flame to the main body of gas in the engine cylinder and by the blast of flame through a restricted passage from the special chamber into the engine cylinder or main combustion space explodes the main charge readily and effectively and thereby increases the power of the engine. In order to prevent back firing, the auxiliary passage for the gas which passes through the spark plug, or ignition means, is provided with a suitable valve, which only opens to admit gas to the electrodes of the spark plug and thence to the special chamber during the admission stroke of the engine.

In the accompanying drawings, Figure 1 is an elevation of a portion of an engine embodying the invention;

Fig. 2 is a longitudinal section of a spark plug constructed in accordance therewith;

Fig. 3 is a section on the line 3—3 of Fig. 2;

Fig. 4 shows a slight modification of the bottom of the spark plug;

Fig. 5 is a detail view showing an arrangement for preventing back firing, in case of failure of the auxiliary valve;

Fig. 6 shows a slightly modified form of construction.

1 represents a binding post to which the upper end of the electrode 9 is attached, the electrode 9 being carried by the insulator 2, and being rectangular in cross section, as shown in Figs. 3 and 6. The upper end of the electrode 9 is threaded so as to receive the binding nut 20, so that as nut 20 is screwed down the electrode 9 is firmly clamped to the insulator 2 and prevented from turning in the insulator as the binding post 1, to which the wire from the battery is attached, is operated. The lower end of the insulator 2 is provided with a conical end as shown, and immediately above it is a shouldered enlargement which fits within the body 4 which is exteriorly screw threaded for adjustment of the engine cylinder in the usual manner. 3 is a bushing nut which screws into the upper end of the body 4 for fastening the insulator tightly in the body. 8 represents a ring having a channel 5, which fits between the shoulder on the body 4 and the engine cylinder, a gasket being provided if desired in order to form a gas tight joint. Communicating with this channel and passing through the body 4 are one or more gas passages 6, which are connected with a passage leading through the ring from the channel 5. 7 is a check valve, preferably mounted in the ring 8, and opening toward the spark plug, being normally seated by a spring, but opening during the admission stroke of the engine. 14 is a pipe leading from the ring 8 to the manifold pipe 17, or any other source of combustible gas, such as an acetylene tank. As shown herein, where the pipe 17 is connected with a carbureter, for purposes of safety, it is desirable to provide a safety gauze or diaphragm 16, which would stop any back fire which might come from the ignition in the cylinder in case the valve 7 failed to close.

The inner threaded end of the body 4 is formed to provide a cylindrical ignition chamber 10, from which open one or more holes 12 into the engine cylinder, 11 being the negative electrode in the case of a jump spark plug, or the equivalent in a make and break spark plug. 21 is a priming cup having a cock 22, and communicating with the channeled passage 5 of the ring so that in case it is desired to prime the engine the gasolene will be drawn into the cylinder through the spark plug, from the cup 21.

The invention is applicable either to four cycle or two cycle engines, it being seen that the passages leading to the electrodes form a continuation of the pipes 14, which all communicate with the carbureter or other source of combustible gas, the whole forming a relatively small by-pass around the admission valve mechanism of the engine, but only open during the admission stroke of the engine, being at other times closed by the valve 7. The result is, that at each admission stroke of the engine a strong current of gas will flow into the cylinder through the spark plug, and over the electrodes, thus tending to mechanically clear them of any foreign materials which may lodge there. By reason of the small ignition opening 12 from the chamber 10 into the engine cylinder, it will be seen that while the gas in chamber 10 will be subjected to the same compression as that in the engine, it will not be contaminated by gas from the engine but will always be pure because of the direct connection from the carbureter or other gas source. This small body of gas can thus be more readily ignited in chamber 10, and its flame will pass through the hole or holes 12 and ignite the larger body of gas under normal conditions and also in many instances when the spark itself would fail to ignite the larger body of gas. By reason of making the electrode 9 angular in cross section so that it cannot turn in the insulator 2, an adjustment once made between the end of the electrode 9 and electrode 11 forms a fixed gap which is not varied as the wires are connected and disconnected at the binding post. Movement of one electrode relatively to the other frequently occurs in spark plugs as now commonly constructed after the air gap has been adjusted, thus throwing out the adjustment and causing considerable trouble in readjusting them. By reason of the connection of the auxiliary gas supply to the ring 8, considerable aid in removing and attaching the spark plug is obtained, since the plug itself can be screwed in and out without having to disconnect the pipes 14; when all the plugs are out, the rings and pipes can be easily uncoupled at the enlargement 15, from the carbureter.

In Fig. 6 a slight modification is shown adapting this invention for some forms of engines wherein the plug openings are below the surface of the head, requiring a somewhat thinner ring with a longer and differently formed passage 5, which, however, performs the same function.

It will be seen that the invention is applicable to other purposes than simply the regular ignition of the engine, such, for instance, as in connection with self-starting devices where an auxiliary and gas supply is employed. In such cases this auxiliary gas supply can be passed through the ignition means of my invention and fired in the usual manner. Acetylene gas is used to some extent for starting engines, as it can be fired by a spark, when suitably mixed with air without compression.

It will be seen that by this invention, the initial spark always occurs in a small body of clean gas, which, as is well known, more readily explodes and which by the flame projected through restricted opening 12 effects a secondary ignition of the larger body of gas which is usually less pure and more difficult to ignite. The clean gas not only produces a better explosion, but it also keeps the electrodes free of foreign material. Various changes and modifications in the details of the construction may be made without departing from the scope of the invention.

Having thus described my invention, I declare that what I claim as new and desire to secure by Letters Patent is:

Ignition means for a combustion engine, comprising in combination with the cylinder of the engine, an auxiliary explosion chamber, a restricted flame opening through the inner wall of said chamber into the main combustion space, means connecting said chamber with a source of gas during the suction stroke of the engine, and electrodes within said chamber for causing an ignition flame to be ejected through said opening.

In testimony whereof I affix my signature in presence of two witnesses.

MORRIS B. IRELAND.

Witnesses:
J. S. WOOSTER,
GEO. N. KERR.